Feb. 14, 1950        J. R. STEINHOFF        2,497,190
ELECTRONIC INDICATOR

Filed June 18, 1948        2 Sheets-Sheet 1

Fig. 1.

Inventor:
John R. Steinhoff

By Stowell + Evans
Attorneys.

Feb. 14, 1950     J. R. STEINHOFF     2,497,190
ELECTRONIC INDICATOR
Filed June 18, 1948     2 Sheets-Sheet 2

Inventor:
John R. Steinhoff
Stowell + Evans
Attorneys

Patented Feb. 14, 1950

2,497,190

UNITED STATES PATENT OFFICE 2,497,190

ELECTRONIC INDICATOR

John R. Steinhoff, Brooklyn, N. Y.

Application June 18, 1948, Serial No. 33,706

7 Claims. (Cl. 343—121)

This invention relates to electronic indicating instruments and more particularly to radio direction instruments whereby the direction of a known radio transmitting station is automatically shown by an indicating device operatively connected through radio receiving apparatus with a directional antenna array.

In an instrument of this character employing a directional antenna array of fixed position relative to the radio receiving apparatus and indicating device, but all of which may be carried on a moving vehicle such as an airplane, individual directional elements of said directional antenna array must be switched or operatively connected in receiving sequence to the radio receiving and amplifying apparatus and in corresponding recurring sequence the output of the amplifying apparatus must be applied to the indicating instrument for proper direction showing. Mechanical commutation or switching has been employed for sequence switching, but mechanical switching entails difficulties arising in part from lack of speed and contactor or circuit breaking troubles. The direct substitution of electronic switching for mechanical does not necessarily overcome important difficulties in the operation of a direction indicating instrument.

It will be clear that the received radio signal strength of each individual antenna element of said directional antenna array must be truly represented and applied as a power magnitude on a corresponding element of the indicating device for accurate showing of the direction of the radio transmitter which is tuned in or received. The simpler and most easily read indicating devices such as an electro-mechanical device carrying a moving pointer commonly require appreciable power for operation where rugged and positive action is desired, yet this operating power must be adequately and accurately controlled with respect to the differential signal strengths of the individual elements of the directional antenna array. It is further important that a recurring sequence switching arrangement coupling in effect a particular directional antenna element received signal with a corresponding visual indicator actuating element, and thereby representing a continuous sampling of signal strength throughout 360° of direction, be effective in action and free from time lag or lack of clearance with respect to succeeding switch steps or equivalent succeeding samples of signal strength.

With these requirements in mind, it is an object of this invention to provide an electronic switching apparatus adapted to operatively couple radio receiving directional antenna elements in recurring sequence with corresponding elements of a visual indicating device.

Another object is to provide power operating circuits and apparatus controlled in correspondence with signal strength received on individual directional antenna elements.

A further object is to provide means for triggering successive tubes of an electronic switch adapted for power operation and low resistance circuit elements.

Still another object is to provide individual directional antenna element activating rectifier circuits having successively very low effective resistance and very high effective resistance as controlled by potentials derived from said electronic switching apparatus.

These objects and other objects hereinafter set forth, are attained by the apparatus of the invention which will be more particularly described with reference to the accompanying drawings in which:

Fig. 1 is a circuit diagram of a radio direction finder embodying the invention;

Fig. 2 is a circuit diagram of a similar radio direction finder with modified apparatus embody the invention; and Fig. 2a is a diagrammatic representation of a circuit and circuit elements which may be added to the apparatus of Fig. 2.

In the figures of the drawings, like reference characters indicate similar elements of the illustrated embodiments.

In Fig. 1, the reference characters A—D identify four loop or directional antennae arranged at 90° to each other and each having one terminal connected by a common lead 1 to the usual tuned input transformer 2 of an amplifier tube 3 having an output coil 4 coupled, together with the coil 5 of a non-directional antenna 6, to the input coil 7 of a high-power electronic amplifier-rectifier unit 8. The rectified carrier output of the unit 8 is impressed upon a direct current amplifier tube 9 having a resistor 10 across which voltages are developed, as will be described later, that are proportional to signal inputs at the directional antennae A—D.

The other terminals of the several directional antennae are individually connected to ground through the selectively activated space discharge paths of diode rectifiers 11, 12 and condensers Ca—Cd, respectively. A separate diode may be employed for each directional antennae circuit but it is convenient and desirable to use double diode tubes of, for example, the 6H6 type. The terminals of the antennae A—D are connected to the cathode elements $a$—$d$ of the diode elements and the corresponding anode elements are connected through leads 13a—13d to the several stages or units 14a—14d of the electronic switch assembly. The switch stages are of identical construction and each includes two triodes 15, 16 in series that may be combined in single envelopes 17a—17d, respectively. The 6SN7GT type of twin triode has proved satisfactory, requiring the use of but four tubes for the switch system.

In each switch stage, the grid-cathode input circuits of the triodes 15, 16 are of identical design and include a transformer secondary winding L in series with a condenser $C_1$, a resistor $R_1$ being shunted across the grid and cathode elements. The primary winding $L_1$ of each transformer is connected between the anode of the triode 15 of the next preceding stage and a source of energizing potential indicated by the character "$+Eb$." The input windings L of the triodes 15 are directly connected to their cathodes while the input windings L of the triodes 16 are grounded and returned to their cathodes through cathode resistors 19 of for example 1000 ohms, that are in effect the plate current supply sources for the diodes 11, 12. The leads 13a—13d from the diodes 11, 12 are connected to the cathodes of the triodes 16 of the several switch stages 14a—14d, and the energizing potentials established on the anodes of the diodes 11, 12 therefore vary with the voltage drops across their associated cathode resistors 19.

A further transformer winding $L_2$, which may be wound upon the primary winding $L_1$, is shunted by a condenser $C_2$ and has one terminal connected to the cathode of the triode 15 through a resistor $R_2$, the other terminal being connected to the anode of the associated triode 16. Adjustable taps on the several resistors $R_2$ are connected by leads 20a—20d to the direction indicating instrument I. These tapped connections are provided to permit adjustment for establishing the same potential on the several leads 20a—20d at zero signal input to the direct current amplifier tube 9.

The instrument I includes stationary field windings energized in accordance with signal energy at the directional antennae A—D and a transversely magnetized rotor, not shown, carrying a pointer 21: the rotor being of the permanent magnet type or of the electromagnetic type described in my prior applications Serial No. 417,835, filed Nov. 4, 1941, now Patent 2,392,420, "Method of and apparatus for radio directional finding," and Serial No. 439,330, filed April 17, 1942, now Patent 2,376,730, "Method of and apparatus for sonic detection." The rotor is not restrained by restoring springs but rotates freely through 360° in accordance with the voltages developed across the field windings 22a—22d. Windings 22a, 22b are serially connected between the leads 20a, 20b from switch stages 14a, 14b that are associated with the diametrically opposed directional antennae A, B; and windings 22c, 22d are similarly connected in series between the leads 20c, 20d. Condensers 23a—23d are connected between the several leads 20a—20d and the common lead 24 that is connected to the anode of the direct current amplifier 9 and has a direct current potential that varies cyclically in accordance with the signal energy input at the several directional antennae A—D.

The instantaneous direct current potential across the resistor 10 is determined by the cardioid pattern resulting from the non-directional antenna 6 and the particular directional antenna then connected to ground by the electronic switching system. The instantaneous voltage impressed upon the common terminals of condenser 23a—23d therefore varies cyclically as the several directional antennae are rendered operative in succession by the voltage drops across resistors 19 of switch stages 14a—14d as the latter are periodically rendered conductive. Steady or fixed direct current voltages are serially impressed upon the opposite terminals of the condensers 23a—23d through the individual leads 20a—20d. The electronic switch system operates, in effect as a double pole, multiple throw switch to connect the directional antennae in sequence to the amplifier-rectifier unit 8 to impose upon one terminal of the associated condensers 23a—23d a directionally significant voltage, and simultaneously to switch a fixed voltage upon the other terminal of the particular condenser 23a—23d corresponding to the directional antenna A—D then energized. The switching frequency depends upon the constants selected for the "timing" condenser-resistor components of the switching system, as will be explained hereinafter, and it is convenient to employ a switching frequency of 20 cycles per second, i. e., each directional antenna is repeatedly connected to the indicating instrument for $\frac{1}{80}$ of a second. A switching frequency of this order permits the simultaneous use of the antennae and amplifier system for the reception of signal intelligence as the loud-speaker or headphones may be designed, or by-passed, to eliminate disturbance from the 80 cycles per second switching.

Each switch stage is energized, through its input transformer, by the collapse of the plate current of the preceding stage upon the completion of the charging of the condenser $C_2$ of that stage. Each stage would resume its conductive condition upon the discharge of condensers $C_1$ through the associated resistors $R_1$ but the circuit constants are so selected that the stages are tripped off in sequence at a frequency somewhat higher than that corresponding to their natural periods of recurring pulses. This precludes conduction simultaneously in two switch stages and prevents any stage from getting out of step. For a switching frequency of 20 cycles per second, appropriate values may be:

$C_1 = 0.002$ microfarad
$C_2 = 0.150$ microfarad
$R_1 = 5$ megohms

Each switch stage is either conductive or non-conductive as the control is of the "on-off" type and not of the modulating or progressive magnitude change type. This is a decided advantage as the timing action is not affected by variations in the mutual conductance values of the several triodes. The plate voltage distribution across the serially connected triodes of each stage is affected by mutual conductance variations but the direct current voltages impressed upon the condenser bank 23a—23d through leads 20a—20d may be equalized by adjustment of the voltage divider resistors $R_2$ which, in one embodiment, had values of 1000 ohms. The plate supply to the anodes of the switching triodes 15 was 300 volts, and the taps of resistors $R_2$ were adjusted to impress 150 volts on the leads 20a—20d as the switch stages were energized in sequence.

The triode 16 of each switch stage may be classed as an oscillator or pulse generator, the plate being inductively coupled to the grid in such sense that an increase in plate current drives the grid more positively, thereby further increasing the plate current and driving the grid positively until it draws current to charge the condenser $C_1$. The condenser $C_2$ causes the grid to continue to draw current for the length of time desired for each stage to remain conductive, the conductive period being longer as the capacity of condenser $C_2$ is increased. When the plate current of a stage starts to decrease, the grids of tubes 15 and 16 of that stage are driven negative, thereby further decreasing the plate current until the grids are driven negative far beyond cutoff. This action also drives the grids of the next switch stage positive, thereby rendering the next stage conductive. The first stage remains non-conductive as the voltage across the condenser $C_1$ slowly leaks off through the high resistance grid resistor $R_1$, and the stage is tripped into conductivity by the cutoff of the preceding stage before the blocking bias leaks off through resistor $R_1$.

As described above, the windings of the direction indicating instrument I are connected to the condensers $23a$—$23d$, and the several condensers are successively charged by the potential difference between the fixed voltage, for example, 150 volts in the particular embodiment above mentioned, applied through leads $20a$—$20d$ and the instantaneous voltage developed by the direct current amplifier 9 across its output resistor 10. If one condenser $23a$—$23d$ of a pair associated with one connected pair of windings $22a$—$22d$ has 100 volts across it and the other has 50 volts, there will be a 50 volt drop across the meter windings and current flows through the windings from one condenser to the other as the condenser voltages tend to equalize. Before this voltage equalization is attained, each condenser is again recharged to its original value and the recharging process is repeated continuously in cycles of such short duration that the equalizing current through the meter coils is substantially continuous. The indicating instrument pointer 21 assumes a position that is determined by the relative magnitudes and directions of the currents thus established in the instrument windings $22a$—$22d$. The condensers $23a$—$23d$ may have values of 4 microfarads when the switching frequency is 20 cycles per second and the windings $22a$—$22d$ each have a resistance of 750 ohms. The voltage is applied to each condenser twenty times per second and this timing allows the 4 microfarad condensers to reassume their proper potential levels in about one-half the period during which each timing stage is conductive thereby maintaining the directionally-significant differential potentials substantially independent of timing variations in the individual stages. The discharge paths of the differential potential between condensers $23a$, $23b$ and between $23c$, $23d$ are of relatively high resistance and the potential differences are not rapidly dissipated during the short intervals between recharging of the condensers to the several potentials indicative of signal strength at the respective directional antennae.

It will be observed that the electronic switch of Fig. 1 comprising tubes $17a$—$17d$ and their associated circuits is capable of handling appreciable power and may be termed a power handling switch as contrasted with voltage operated electronic switches known in the art.

Tubes $17a$—$17d$ are each dual triodes or their equivalent, which, when conducting, as occurs in sequence by grid voltage change, show a relatively low resistance to the flow of current from the anode current supply $+E_b$ and this relatively low tube resistance is adapted to handle the appreciable plate output power of tube 9. Other power circuit elements such as indicator windings $22a$—$22d$, transformer windings $L_1$ and $L_2$, and resistors $R_2$ and 19 have relatively low resistance values keeping the total power circuit resistance low and adapted for handling appreciable power and current values. Condensers $23a$—$23d$ have a large capacity value adapted to steady the flow of power currents.

In addition to the new and useful amplified power output switching provided by the apparatus of Fig. 1 employing tubes $17a$—$17d$, low impedance input circuit switching is provided in conjunction with the voltage activated rectifiers represented by diode elements $a$, $b$, $c$ and $d$ of tubes 11 and 12. A conducting diode, as is represented, for example by diode $a$ when tube $17a$ is conducting and a positive voltage derived from the cathode resistor 19 of tube $17a$ is impressed on the plate of diode $a$, shows a desirable low resistance or impedance for purposes as here employed for directional antenna element switching.

It may be further noted that in the electronic switch of Fig. 1, which comprises the series sequence of switch stages having tubes $17a$—$17d$ and associated circuits, the actual trigger voltage which operates each tube is derived from the breakdown of a magnetic field set up by the preceding conducting tube in a transformer or equivalent magnetic winding. Since the electronic switch of Fig. 1 is current or power operated rather than one of the familiar voltage operated types, the appreciable current flow is adapted to set up a strong magnetic field in a winding which is capable of developing a strong trigger voltage pulse upon stopping of current flow and consequent breakdown of the magnetic field.

In brief, then, this invention provides power output electronic switching with low resistance input switching and electronic switch triggering by means of voltages derived from the breakdown of magnetic fields. Further generally improved performance with particular improvement in increased power handling ability over the apparatus of Fig. 1 is represented by the circuits and apparatus of Fig. 2.

In Fig. 2, grid controlled gas discharge tubes $T_{11}$, $T_{12}$, $T_{13}$, and $T_{14}$ familiarly known as thyratrons, or their equivalent, are employed in a multiphase oscillator circuit forming an electronic switch ES1. As is well-known, a thyratron tube will remain non-conducting or de-ionized, and therefore act as an open circuit, under a sufficiently large fixed negative bias until a positive grid or trigger voltage reduces the negative bias to a point characteristic of the tube whereupon the tube becomes conductive and remains conductive until the anode voltage is cut off. When ionized the tube is equivalent to a switch of low resistance as there is a very low voltage drop across the thyratron. Therefore, a sequence of thyratrons employed in an electronic switch must have an anode current supply, an initial grid voltage, a trigger or firing grid pulse or voltage, and means for cutting off anode current or otherwise restoring the tubes to initial or non-conducting condition.

A directional antenna array A—B—C—D adapted for sequence switching of its elements is coupled by a transformer $P_{21}$—$S_{21}$ tuned by condenser $C_7$ into a radio amplifier 38 connected also with non-directional antenna 6, and the output of amplifier 38, preferably of the superheterodyne type, is coupled by a transformer $P_{22}$—$S_{22}$ tuned by condenser $C_4$ with a rectifier circuit including a diode rectifier $T_5$. The direct current output of diode $T_5$ filtered by resistance $R_4$ and capacity $C_5$ is applied across grid and cathode elements of a power amplifier tube $T_6$ which has a relatively high resistance $R_{10}$ connected between grid and cathode connection 30 and has an anode current supply from $+Eb$ of the order of 300 volts. The cathode connection 30 of tube $T_6$ returns to ground and negative of the anode current supply through a circuit including resistance and may be any one of the trigger circuits of electronic switch ES1, depending upon which one of the thyratron tubes $T_{11}$—$T_{14}$ is conducting. If, for example, one of the identical switch stages is conducting, say that including thyratron tube $T_{11}$, cathode connection 30 of tube $T_6$ returns to ground through resistor $R_{51}$, tube $T_{11}$, coil $P_{11}$ and diode $D_1$ and the total resistance of this circuit becomes the cathode resistance familiar in conventional amplifiers.

Tube $T_6$ has an anode potential of the order of 300 volts from $+Eb$ and has a cathode connection 30 resistance to ground through load resistors $R_{51}$, $R_{52}$, $R_{53}$ and $R_{54}$ each having a resistance of about 2500 ohms. Resistors $R_{61}$, $R_{62}$, $R_{63}$ and $R_{64}$ are relatively high, for example, 20,000 ohms, and resistors $R_{65}$ and $R_{66}$ are relatively low, for example, 50 ohms, thus providing a negative potential on diodes $D_1$—$D_4$ when the corresponding thyratron is not conducting, negligible circuit resistance being added by any one of thyratron tubes $T_{11}$—$T_{14}$ when conducting and its respective cathode circuit coil $P_{11-14}$.

As hereinbefore mentioned, a conducting thyratron is not deionized or restored to non-conducting condition without some means of cutting off anode current supply or an equivalent. Here, anode current supply for thyratrons $T_{11}$—$T_{14}$ is conveniently cut off by means of a blocking oscillator 26 capable of delivering a short negative pulse of high amplitude to the grid of tube $T_6$ thereby cutting off conduction and instantaneously reducing the potential of cathode connection 30 to zero with respect to ground. One form of blocking oscillator represented by 26 comprises a triode oscillator tube $T_8$ having a grid coil $S_3$ with grid condenser $C_6$ and grid leak $R_3$ and a plate feedback coil $P_2$ inductively coupled with grid coil $S_3$ and also inductively coupled with a voltage take-off coil $S_2$. A negative voltage developed in coil $S_2$ applied to the grid of tube $T_6$ through resistor $R_{20}$ while a positive voltage is clipped or limited by conduction of a diode $T_7$ connected across coil $S_2$. The negative voltage pulse derived from coil $S_2$ and applied to the grid of tube $T_6$ may be shaped or controlled in duration to a few microseconds by any suitable means as by selecting values for resistor $R_{20}$ and condenser $C_5$ which may have values of .5 megohm and 100 mmf. respectively.

Another important service of blocking oscillator 26 is the accurate timing of each sequence step of the electronic switch ES1. As will be described, each of successive thyratrons $T_{11}$—$T_{14}$ fires or conducts immediately after its preceding stage has fired and been cut off and it will be clear that the cut-off intervals accurately determined by the blocking oscillator 26 will accurately control the time interval of each sequence step of the electronic switch ES1. In a system such as the sampling of signal strength from successive elements of a directional antenna array, it is obviously important to maintain the time duration of each sample equal as well as register its amplitude or intensity.

Having described the conductive operation and cut-off of a thyratron in electronic switch ES1, the trigger operation of successive stages will be explained. Initially, the grid controlled discharge tubes or thyratrons $T_{11}$—$T_{14}$ have their grids maintained at a negative potential from a supply $-Ec$ through preferably low resistance coils $S_{11}$—$S_{14}$ and no thyratrons of electronic switch ES1 are conducting. The electronic switch ES1 may be started by any convenient means as by momentarily grounding the grid of thyratron $T_{11}$ making same fire or conduct until anode potential is removed by the blocking oscillator action on the grid of tube $T_6$ described hereinbefore. When thyratron $T_{11}$ ceases to conduct, the drop of current in coil $P_{11}$ induces a positive pulse in coil $S_{11}$ causing thyratron $T_{12}$ to conduct, again until anode current cut-off by blocking oscillator 26, whence in similar fashion thyratron $T_{13}$ conducts then triggers thyratron $T_{14}$ with conduction and triggering continuing in recurring sequence through the successive stages of electronic switch ES1. Condensers $C_{21}$ improve the positive voltage pulse characteristics applied to the thyratron grids, and it may be noted that any negative pulse existing is immaterial since thyratron grids are initially made negative.

The appreciable output power of electronic switch ES1 is applied to coils of an electro-magnetic indicator device I having a plurality of pole pieces such as 32a and 32b and a freely rotatable magnetic member carrying an indicating pointer 31a. Coil terminals K—L—J—M of indicator device I connect respectively to the anodes of thyratrons $T_{11}$—$T_{12}$—$T_{13}$—$T_{14}$ supplied with power through resistors $R_{51}$—$R_{54}$. When any thyratron conducts, its corresponding coil terminal connection is short circuited to ground through the conducting thyratron. For example, when thyratron $T_{11}$ conducts, terminal K is practically shorted to ground and current from the cathode connection 30 of tube $T_6$ flows through load resistor $R_{52}$ and terminal L through indicator I coils to terminal K and ground. Similarly, current flow in the indicator I coils may be from terminals K to L, M to J, or J to M depending upon which thyratron of electronic switch ES1 is conducting. These sequence current flows in coils of indicator I, with preferably some electric current damping provided by condensers $C_3$ in electronic switch ES1, set up a magnetic field controlling the position and direction indication of pointer 31a of indicator I. It is remembered that the applied potential from the cathode connection 30 of tube $T_6$ is controlled by radio signal strength and thereby controls the strength and direction of the magnetic field of indicator I and the position of pointer 31a.

Input switching of elements of the directional antenna array A—B—C—D is also accomplished by electronic switch ES1 in conjunction with rectifier circuits including resistors $R_{17}$—$R_{74}$, direct current blocking condensers $C_{11}$—$C_{14}$ and rectifier elements $D_1$—$D_4$ which may be diodes or equivalent crystal rectifiers such as germanium or silicon types. A rectifier, such as $D_1$, may be selected as having a very high resistance or poor conductivity unless an actuating positive voltage is applied causing said rectifier to show a low resistance and good conductivity. When thyratron $T_{11}$ of electronic switch ES1 conducts, a positive voltage appears across resistor $R_{61}$ which is applied through resistor $R_{71}$ to rectifier $D_1$ making said rectifier $D_1$ a good conductor and effectively connecting antenna element A in the primary input circuit including primary coil $P_{21}$ coupled with coil $S_{21}$ tuned by condenser $C_7$ at the input of radio amplifier 38. Similarly, when any one of the other thyratrons of switch ES1 conducts, its corresponding rectifier of $D_1$—$D_4$ and antenna element of A—C is activated and coupled to the input of radio amplifier 38. The combination antenna signal input to radio amplifier 38 of an element of directional antenna array A—D with that of a non-directional antenna 6 provides a desirable directional wave pattern, though any other antenna system may be switched by the apparatus provided.

Although separately described, it will be understood that electronic switch ES1 and associated apparatus accomplishes simultaneous step by step control, in recurring sequence, of antenna input to radio amplifier 38 and its developed power output to a direction indicating electromechanical indicator I. Further, the time interval of each step is accurately controlled and the directional magnetic field strength developed in indicator I corresponds exactly with the directional intensity of a received radio signal.

It is characteristic of all of the modifications of the invention that amplification of the signal voltages is effected in a single channel only thus eliminating any errors or inaccuracies which might arise from lack of exactness in mutual conductance of tube elements due to initial difference in tube characteristics or to the effect of aging, variation in anode or heater potentials and the like. The signal voltages thus amplified in a single channel are successively applied to a plurality of independent load elements actuating the indicator to give an integrated response to the incoming signals. Any variations in the amplifier channel will affect all of the amplified signals identically and will thus be balanced out in the integrated response.

A modification of the apparatus of Fig. 2 by adding to it the elements shown in Fig. 2a may be made for purposes such as airport control work wherein it is desired to obtain from a ground or airport control tower installation an instantaneous and continuous fix or location of an incoming airplane. By providing a second directional antenna array AB2—CD2 with a second indicating device I2 and second electronic switch ES2, all equivalent units duplicating the single units hereinbefore described with reference to Fig. 2, dual directional readings may be taken from different receiving points fixing direction and distance by intersection of the two directional readings relative to the receiving points and the known airport lay-out. Indicators I and I2 may be mounted together for convenient reading and electronic switch ES2 may be coupled into electronic switch ES1 by opening jumper 27 and connecting lead 28 with lead 28' and lead 29 with 29' and also connecting cathode connection 30 of tube $T_6$ with switch ES2 at lead 30'. Switches ES1 and ES2 are then combined in a sequence of eight instead of four switch stages providing operation of the dual input and output direction indicator with a single radio amplifier 38. Each indicator and its related antenna array employs one-half of the time of the combined electronic switch and radio amplifier 38, but the available switch power output is adequate for operation of a plurality of instruments. Dual direction indications have considerable value in air and water navigation and the combination herein described illustrates the usefulness and adaptability of the apparatus of this invention.

The term "indicating device" used in the description and claims hereof may include means whereby the integrated response of the coil windings actuate any suitable control device and the directional "indication" provided by the invention may include or consist solely in the responses of such control device.

It is to be understood that the invention is not limited to the particular circuit arrangements or to the particular values herein recited and that there is considerable latitude in the circuit arrangement and circuit element constants of indicating systems that fall within the spirit of my invention as set forth in the following claims.

This application is a continuation-in-part of my application Ser. No. 559,642, filed October 20, 1944, now abandoned.

I claim:

1. An electronic direction-indicating system comprising an antennae array providing a plurality of directional antenna circuits, a single radio amplifying channel, an indicating device including a plurality of windings and pointer means movable in response to the magnitude and sense of currents in said windings, and means for cyclically connecting said antennae circuits to said amplifying channel and synchronously connecting the amplifying channel to a corresponding terminal of said windings through low-resistance non-amplifying circuit elements comprising a series succession of electronic tube stages corresponding in number to the number of said winding terminals, and connections between said tube stages for establishing conduction in one stage upon the cessation of conduction in the preceding stage.

2. An electronic direction-indicating system comprising an antennae array providing a plurality of directional antenna circuits, a single radio amplifying channel, an indicating device including a plurality of windings and pointer means movable in response to the magnitude and sense of currents in said windings, and means for cyclically connecting said antennae circuits to said amplifying channel and synchronously connecting the amplifying channel to a corresponding terminal of said windings through low-resistance non-amplifying circuit elements comprising a series succession of electronic tube stages corresponding in number to the number of said winding terminals, and magnetic inductive connections between said tube stages for establishing conduction in one stage upon the cessation of conduction in the preceding stage.

3. An electronic direction-indicating system comprising an antennae array providing a plurality of directional antenna circuits, a single radio amplifying channel, an indicating device including a plurality of windings and pointer means movable in response to the magnitude and sense of currents in said windings, and means for cyclically connecting said antennae circuits to said amplifying channel and synchronously connecting the amplifying channel to a corresponding terminal of said windings through low-resistance non-amplifying circuit elements comprising a series succession of thyratrons corresponding in number to the number of said winding terminals, a common connection between said amplifying channel and said thyratrons including negative pulse generating means for periodically blocking anode potential supply to said thyratrons, and connections between said thyratrons for establishing conduction in a succeeding thyratron upon cessation of conduction in a preceding thyratron in the series.

4. An electronic direction-indicating system comprising an antennae array providing a plurality of directional antenna circuits, a single radio amplifying channel, an indicating device including a plurality of windings and pointer means movable in response to the magnitude and sense of currents in said windings, and means for cyclically connecting said antennae circuits to said amplifying channel and synchronously connecting the amplifying channel to a corresponding terminal of said windings through low-resistance non-amplifying circuit elements comprising a series succession of thyratrons corresponding in number to the number of said winding terminals, a common connection between said amplifying channel and said thyratrons including negative pulse generating means for periodically blocking anode potential supply to said thyratrons, and magnetic inductive connections between said thyratrons for establishing conduction in a succeeding thyratron upon cessation of conduction in a preceding thyratron in the series.

5. An electronic direction-indicating system comprising an antennae array providing a plurality of directional antenna circuits, a diode in each of said antennae circuits, a single radio amplifying channel, an indicating device including a plurality of windings and pointer means movable in response to the magnitude and sense of currents in said windings, and means for cyclically connecting said antennae circuits to said amplifying channel and synchronously connecting the amplifying channel to a corresponding terminal of said windings through low-resistance non-amplifying circuit elements comprising a series succession of electronic tube stages corresponding in number to the number of said winding terminals, and connections between said tube stages for establishing conduction in one stage upon the cessation of conduction in the preceding stage.

6. An electronic direction-indicating system comprising an antennae array providing at least three directional antennae circuits, a diode in each of said antennae circuits, a single radio amplifying channel, an indicating device including a plurality of windings and pointer means movable in response to the magnitude and sense of currents in said windings, and means for cyclically connecting said antennae circuits to said amplifying channel through said diodes and synchronously connecting the amplifying channel to a corresponding terminal of said winding through low-resistance non-amplifying circuit elements, comprising a series succession of electronic tube stages corresponding in number to the number of said winding terminals, connections between said tube stages for establishing conduction in one stage upon cessation of conduction in the preceding stage, a source of voltage, and circuit elements for connecting said voltage source across each of said diodes in succession through the corresponding tube stage during its conductive period.

7. An electronic direction-indicating system comprising an antennae array providing four directional antennae circuits, a diode in each of said antennae circuits, a single radio amplifying channel, an indicating device including a plurality of windings and pointer means movable in response to the magnitude and sense of currents in said windings, and means for cyclically connecting said antennae circuits to said amplifying channel through said diodes and synchronously connecting the amplifying channel to a corresponding terminal of said winding through low-resistance non-amplifying circuit elements, comprising a series succession of four electronic tube stages, connections between said tube stages for establishing conduction in one stage upon cessation of conduction in the preceding stage, a source of voltage, and circuit elements for connecting said voltage source across each of said diodes in succession through the corresponding tube stage during its conductive period.

JOHN R. STEINHOFF.

No references cited.